United States Patent
Byon

(10) Patent No.: US 12,006,859 B2
(45) Date of Patent: Jun. 11, 2024

(54) LINK MECHANISM

(71) Applicant: IHI Corporation, Tokyo (JP)

(72) Inventor: Jinhee Byon, Tokyo (JP)

(73) Assignee: IHI Corporation, Tokyo (JP)

( * ) Notice: Subject to any disclaimer, the term of this patent is extended or adjusted under 35 U.S.C. 154(b) by 110 days.

(21) Appl. No.: 17/807,210

(22) Filed: Jun. 16, 2022

(65) Prior Publication Data

US 2022/0307410 A1 Sep. 29, 2022

Related U.S. Application Data

(63) Continuation of application No. PCT/JP2021/010687, filed on Mar. 16, 2021.

(30) Foreign Application Priority Data

Apr. 7, 2020 (JP) ................................. 2020-069164

(51) Int. Cl.
*F16C 11/04* (2006.01)
*F02B 37/18* (2006.01)
*F16H 21/40* (2006.01)

(52) U.S. Cl.
CPC ............ *F02B 37/186* (2013.01); *F16C 11/04* (2013.01); *F16H 21/40* (2013.01)

(58) Field of Classification Search
CPC ....... F02B 37/186; F16C 11/048; F16H 21/40
See application file for complete search history.

(56) References Cited

U.S. PATENT DOCUMENTS

| 10,487,725 | B2 * | 11/2019 | Takahashi | F02B 37/186 |
| 10,533,491 | B1 * | 1/2020 | Milburn | F02B 37/186 |
| 2017/0145911 | A1 | 5/2017 | Takahashi et al. | |

FOREIGN PATENT DOCUMENTS

| JP | 2-80215 U | | 6/1990 |
| JP | H02-80215 U | * | 6/1990 |
| JP | 2013-130133 A | | 7/2013 |
| JP | 2018-127989 A | | 8/2018 |
| WO | WO 2016/031565 A1 | | 3/2016 |

OTHER PUBLICATIONS

International Search Report issued May 18, 2021 in PCT/JP2021/010687 filed on Mar. 16, 2021, 2 pages.

* cited by examiner

*Primary Examiner* — Gregory Robert Weber
(74) *Attorney, Agent, or Firm* — Oblon, McClelland, Maier & Neustadt, L.L.P.

(57) ABSTRACT

A link mechanism includes: a first link portion including a first hole; a second link portion including a second hole; a rotary shaft of a rotating body attached to the first or second link portion; a spring arranged between the first link portion and the second link portion; and a connecting pin including: a larger-diameter portion located on the first link portion at a side opposite to the second link portion and the spring and having an outer diameter larger than an inner diameter of the first hole and an inner diameter of the second hole; a medium-diameter portion having an outer diameter smaller than that of the larger-diameter portion and at least partially located within the first hole; and a smaller-diameter portion having an outer diameter smaller than that of the medium-diameter portion and at least partially located within the second hole.

7 Claims, 9 Drawing Sheets

LINK MECHANISM

CROSS REFERENCE TO RELATED APPLICATIONS

This application is a continuation application of International Application No. PCT/JP2021/010687, filed on Mar. 16, 2021, which claims priority to Japanese Patent Application No. 2020-069164, filed on Apr. 7, 2020, the entire contents of which are incorporated by reference herein.

BACKGROUND ART

Technical Field

The present disclosure relates to a Link Mechanism.

Conventionally, a wastegate port is formed in a turbine housing. Patent Literature 1 discloses a link mechanism that opens and closes the wastegate port. The link mechanism includes a rod, a link plate, a connecting pin, a spring, and a retaining ring. The connecting pin connects the rod and the link plate relatively rotatable with each other. The connecting pin is inserted into the spring arranged between the link plate and the rod. The spring biases the link plate and the rod in directions spaced apart from each other. The retaining ring is attached to the connecting pin. The retaining ring prevents the link plate and the rod from falling off the connecting pin.

CITATION LIST

Patent Literature

Patent Literature 1: WO 2016/031565 A1

SUMMARY

Technical Problem

However, due to a biasing force of the spring, a load is always applied to the retaining ring. When the link mechanism is driven under this load, the retaining ring may wear out. When the retaining ring wears out, it easily falls off from the connecting pin. As a result, the link plate and rod may fall off the connecting pins.

The present disclosure aims to provide a link mechanism that can prevent a link portion from falling off.

Solution to Problem

To solve the above problem, a link mechanism of the present disclosure includes a first link portion including a first hole; a second link portion including a second hole; a rotary shaft of a rotating body attached to the first link portion or the second link portion; a spring arranged between the first link portion and the second link portion; and a connecting pin including: a larger-diameter portion that is located on the first link portion at a side opposite to the second link portion and the spring and that has an outer diameter larger than an inner diameter of the first hole and an inner diameter of the second hole; a medium-diameter portion that has an outer diameter smaller than that of the larger-diameter portion and that is at least partially located within the first hole; and a smaller-diameter portion that has an outer diameter smaller than that of the medium-diameter portion and that is at least partially located within the second hole.

The connecting pin may satisfy the following formulas: $1.15 \leq D2/D1 \leq 2$; and $1.1 \leq n/d \leq 5$, where D1: the outer diameter of the medium-diameter portion, D2: the outer diameter of the larger-diameter portion, d: half of the difference between D1 and D2, and n: a height of the larger-diameter portion in a central axis direction.

The connecting pin may include: a first portion including the smaller-diameter portion; and a second portion arranged radially outside the smaller-diameter portion and including the medium-diameter portion and the larger-diameter portion.

Effects of Disclosure

According to the present disclosure, it is possible to prevent the link portion from falling off.

BRIEF DESCRIPTION OF DRAWINGS

FIG. 5 is an internal view of the turbine housing after the valve shown in FIG. 3 has rotated in the direction of arrow a.

DESCRIPTION OF EMBODIMENTS

Embodiments of the present disclosure will be described in detail below with reference to the accompanying drawings. Specific dimensions, materials, and numerical values described in the embodiments are merely examples for a better understanding, and do not limit the present disclosure unless otherwise specified. In this specification and the drawings, duplicate explanations are omitted for elements having substantially the same functions and configurations by assigning the same sign. Furthermore, elements not directly related to the present disclosure are omitted from the figures.

Figure 1:
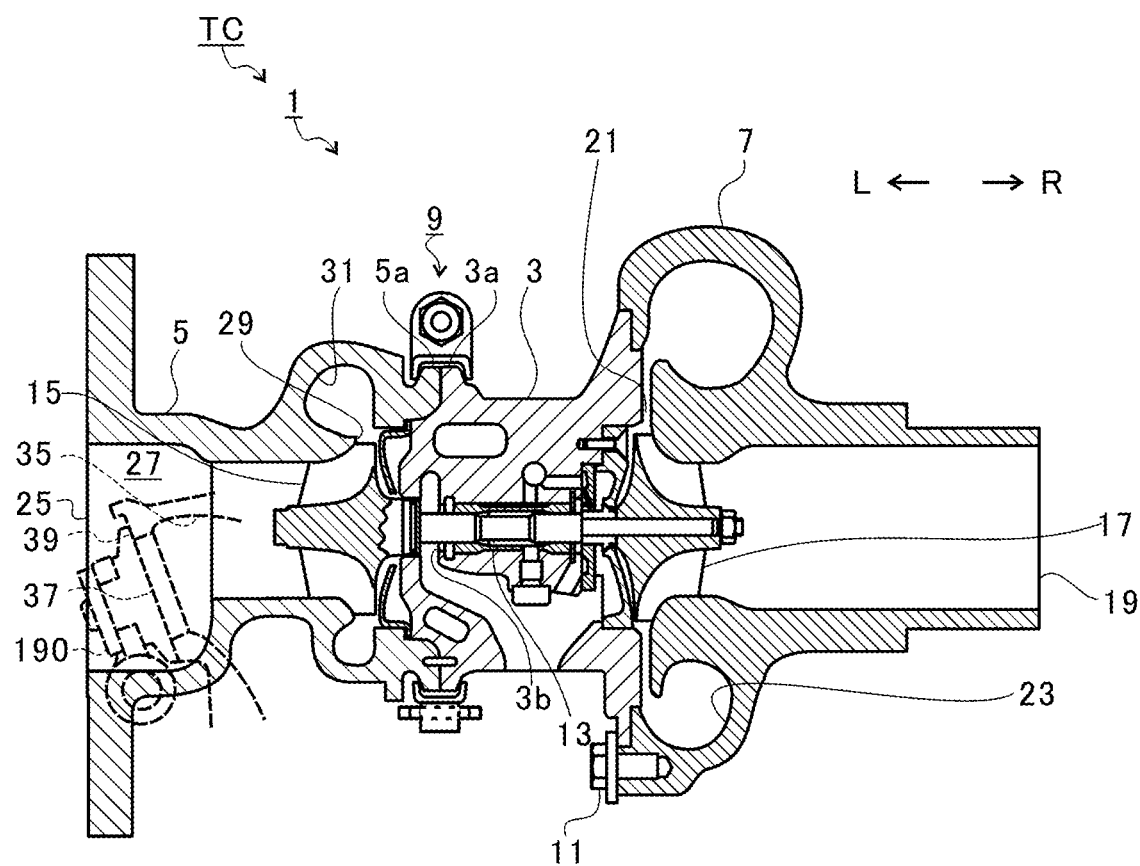
FIG. 1 is a schematic cross-sectional view of a turbocharger.

FIG. 1 is a schematic cross-sectional view of a turbocharger TC. Hereinafter, a direction indicated by an arrow L shown in FIG. 1 is described as the left side of the turbocharger TC. A direction indicated by an arrow R shown in FIG. 1 is described as the right side of the turbocharger TC. As shown in FIG. 1, the turbocharger TC comprises a turbocharger body 1. The turbocharger body 1 includes a bearing housing 3, a turbine housing 5, and a compressor housing 7. The turbine housing 5 is connected to the left side of the bearing housing 3 by a fastening mechanism 9. The compressor housing 7 is connected to the right side of the bearing housing 3 by fastening bolts 11.

A protrusion 3a is provided on an outer surface of the bearing housing 3. The protrusion 3a is provided closer to the turbine housing 5. The protrusion 3a protrudes in a radial direction of the bearing housing 3. A protrusion 5a is provided on an outer surface of the turbine housing 5. The protrusion 5a is provided closer to the bearing housing 3. The protrusion 5a protrudes in a radial direction of the turbine housing 5. The bearing housing 3 and the turbine housing 5 are band-fastened by the fastening mechanism 9. The fastening mechanism 9 includes, for example, a G-coupling. The fastening mechanism 9 clamps the protrusions 3a and 5a.

A bearing hole 3b is formed in the bearing housing 3. The bearing hole 3b penetrates in the left-to-right direction of the turbocharger TC. A bearing is arranged in the bearing hole 3b. A shaft 13 is inserted into the bearing. The bearing rotatably supports the shaft 13. In the present embodiment, the bearing is a sliding bearing. However, the bearing is not limited thereto, and may also be a rolling bearing. A turbine impeller 15 is provided at the left end of the shaft 13. The turbine impeller 15 is rotatably housed in the turbine housing 5. A compressor impeller 17 is provided at the right end of shaft 13. The compressor impeller 17 is rotatably housed in the compressor housing 7.

An inlet 19 is formed in the compressor housing 7. The inlet 19 opens to the right side of the turbocharger TC. The inlet 19 is connected to an air cleaner (not shown). A diffuser flow path 21 is formed by the opposing surfaces of the bearing housing 3 and the compressor housing 7. The diffuser flow path 21 pressurizes air. The diffuser flow path 21 is formed in an annular shape. The diffuser flow path 21 is connected to the inlet 19 via the compressor impeller 17 at a radially inner part.

A compressor scroll flow path 23 is formed in the compressor housing 7. The compressor scroll flow path 23 is formed in an annular shape. The compressor scroll flow path 23 is located, for example, outside the diffuser flow path 21 in a radial direction of the shaft 13. The compressor scroll flow path 23 is connected to an engine intake (not shown) and the diffuser flow path 21. When the compressor impeller 17 rotates, air is sucked into the compressor housing 7 from the inlet 19. The intake air is pressurized and accelerated while passing through blades of the compressor impeller 17. The pressurized and accelerated air is further pressurized in the diffuser flow path 21 and the compressor scroll flow path 23. The pressurized air is directed to the engine intake.

An outlet 25 is formed in the turbine housing 5. The outlet 25 opens to the left side of the turbocharger TC. The outlet 25 is connected to an exhaust gas purifier (not shown). An internal space 27 is formed inside the turbine housing 5. The internal space 27 opens to the outlet 25. The internal space 27 is formed downstream of the turbine impeller 15 (closer to the outlet 25).

A connecting path 29 and a turbine scroll flow path 31 are formed in the turbine housing 5. The turbine scroll flow path 31 is formed in an annular shape. The turbine scroll flow path 31 is located, for example, outside the connecting path 29 in the radial direction of the shaft 13. The turbine scroll flow path 31 is connected to a gas inlet 33 (see FIG. 2). Exhaust gas discharged from an exhaust manifold (not shown) of the engine is directed to the gas inlet 33. The connecting path 29 connects the turbine scroll flow path 31 to the outlet 25 (internal space 27) through the turbine impeller 15. The exhaust gas led from the gas inlet 33 to the turbine scroll flow path 31 is led to the outlet 25 through the connecting path 29, the turbine impeller 15 and the internal space 27. The exhaust gas led to the outlet 25 rotates the turbine impeller 15 while passing therethrough.

The rotational force of the turbine impeller 15 is transmitted to the compressor impeller 17 via the shaft 13. As the compressor impeller 17 rotates, the air is pressurized as described above. As such, the air is directed to the engine intake.

Figure 2:
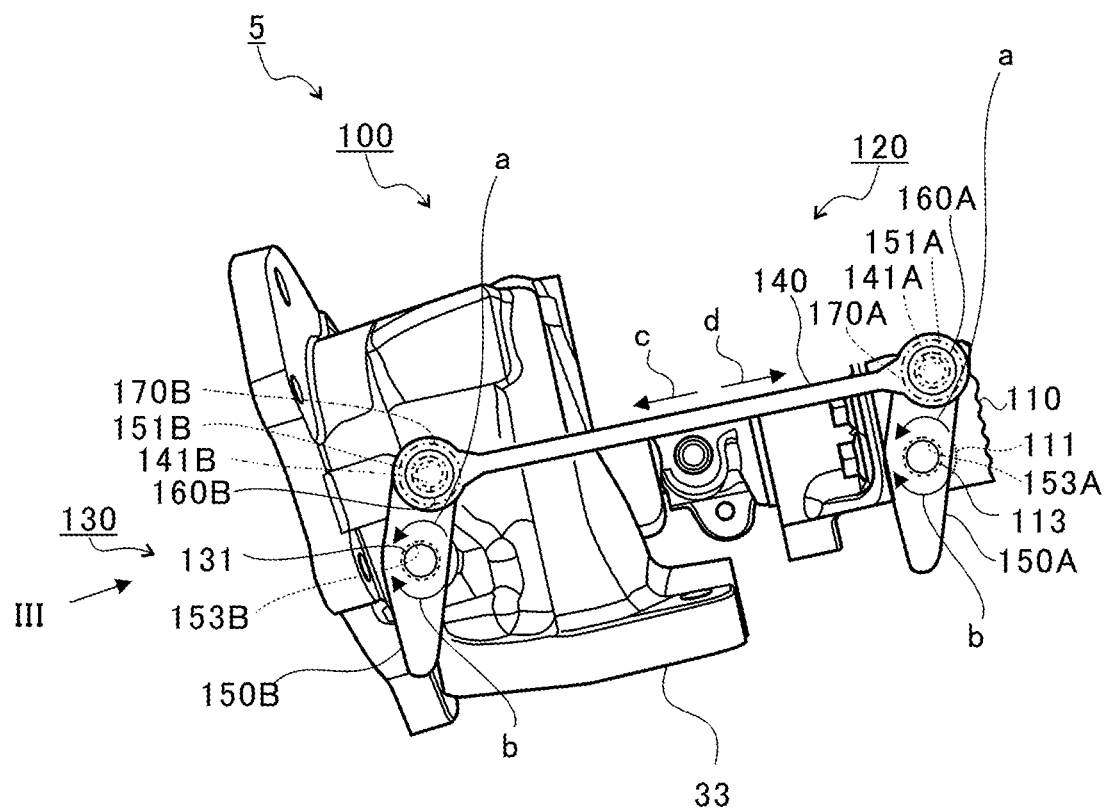
FIG. 2 is a perspective view of a turbine housing.

FIG. 2 is a perspective view of the turbine housing 5. As shown in FIG. 2, the turbine housing 5 is provided with a valve device 100. The valve device 100 includes an actuator 110, a link mechanism 120, and a rotating structure 130. As shown in FIG. 2, the actuator 110 and the link mechanism 120 are located outside the turbine housing 5.

The actuator 110 includes a motor. The motor includes a rotor (rotating body) 111 and a stator (not shown). A rotary shaft 113 of the rotor 111 is connected to the link mechanism 120. The actuator 110 rotates the rotary shaft 113 around a central axis (in directions indicated by arrow a and arrow b in FIG. 2).

The link mechanism 120 includes a rod 140, an actuator-side link plate 150A, a valve-side link plate 150B, an actuator-side connecting pin 160A, a valve-side connecting pin 160B, an actuator-side spring 170A, and a valve-side spring 170B.

In the actuator-side link plate 150A, a pin hole 151A and a shaft hole 153A are formed. The actuator-side connecting pin 160A is inserted into the pin hole 151A. The rotary shaft 113 of the rotor 111 is inserted into the shaft hole 153A. The rotary shaft 113 is fixed to the actuator-side link plate 150A. The rotary shaft 113 integrally rotates with the actuator-side link plate 150A. The actuator-side link plate 150A rotates around the central axis of the rotary shaft 113 in the directions of arrow a and arrow b in FIG. 2.

In the rod 140, an actuator-side insertion hole 141A and a valve-side insertion hole 141B are formed. The actuator-side connecting pin 160A is inserted into the actuator-side insertion hole 141A. The valve-side connecting pin 160B is inserted into the valve-side insertion hole 141B. One end of the rod 140 is connected to the actuator-side link plate 150A via the actuator-side connecting pin 160A, and the other end is connected to the valve-side link plate 150B via the valve-side connecting pin 160B.

The actuator-side connecting pin 160A is inserted into the actuator-side insertion hole 141A and the pin hole 151A. The actuator-side connecting pin 160A connects the rod 140 to the actuator-side link plate 150A relatively rotatable with each other. In this embodiment, the actuator-side connecting pin 160A is fixed to the actuator-side link plate 150A. The actuator-side connecting pin 160A rotatably holds the rod 140. A surface hardening treatment such as electroless nickel plating or nitriding treatment is applied to the actuator-side connecting pin 160A. This improves the wear resistance of the actuator-side connecting pin 160A.

The actuator-side connecting pin 160A is inserted into the actuator-side spring 170A. The actuator-side spring 170A is arranged between the rod 140 and the actuator-side link plate 150A. The actuator-side spring 170A has, for example, a disk shape. In this embodiment, the actuator-side spring 170A is a disc spring. However, the actuator-side spring 170A is not limited thereto, and may be any other spring such as a coil spring or a plate spring. The actuator-side spring 170A includes one end contacting the rod 140 and the other end contacting the actuator-side link plate 150A. The actuator-side spring 170A biases the rod 140 and the actuator-side link plate 150A in directions spaced apart from each other. By arranging the actuator-side spring 170A between the rod 140 and the actuator-side link plate 150A, vibration transmission between the rod 140 and the actuator-side link plate 150A is curbed.

In the valve-side link plate 150B, a pin hole 151B and a shaft hole 153B are formed. The valve-side connecting pin 160B is inserted into the pin hole 151B. A rotary shaft 131 of the rotating structure 130 is inserted into the shaft hole 153B. The rotary shaft 131 is fixed to the valve-side link plate 150B. The rotary shaft 131 integrally rotates with the valve-side link plate 150B. The valve-side link plate 150B rotates around a central axis of the rotary shaft 131 in directions indicated by arrow a and arrow b in FIG. 2.

The valve-side connecting pin 160B is configured in the same manner as the actuator-side connecting pin 160A. The valve-side connecting pin 160B is inserted into the valve-side insertion hole 141B and the pin hole 151B. The valve-side connecting pin 160B connects the rod 140 and the valve-side link plate 150B relatively rotatable with each other. In this embodiment, the valve-side connecting pin 160B is fixed to the valve-side link plate 150B. The valve-side connecting pin 160B rotatably holds the rod 140.

The valve-side spring 170B is configured in the same manner as the actuator-side spring 170A. The valve-side connecting pin 160B is inserted into the valve-side spring 170B. The valve-side spring 170B is arranged between the rod 140 and the valve-side link plate 150B. The valve-side spring 170B includes one end contacting the rod 140 and the other end contacting the valve-side link plate 150B. The valve-side spring 170B biases the rod 140 and the valve-side link plate 150B in directions spaced apart from each other. By arranging the valve-side spring 170B between the rod 140 and the valve-side link plate 150B, vibration transmission between the rod 140 and the valve-side link plate 150B is curbed.

When the actuator 110 is driven, the actuator-side link plate 150A rotates around the central axis of the rotary shaft 113 in the direction of arrow a or arrow b in FIG. 2. When the actuator-side link plate 150A rotates in the direction of arrow a in FIG. 2, the rod 140 moves in a direction of arrow c in FIG. 2. When the rod 140 moves in the direction of arrow c in FIG. 2, the valve-side link plate 150B rotates in the direction of arrow a in FIG. 2 around the central axis of the rotary shaft 131.

When the actuator-side link plate 150A rotates in the direction of arrow b in FIG. 2, the rod 140 moves in a direction of arrow d in FIG. 2. When the rod 140 moves in the direction of arrow d in FIG. 2, the valve-side link plate 150B rotates in the direction of arrow b in FIG. 2 around the central axis of the rotary shaft 131.

Figure 3:
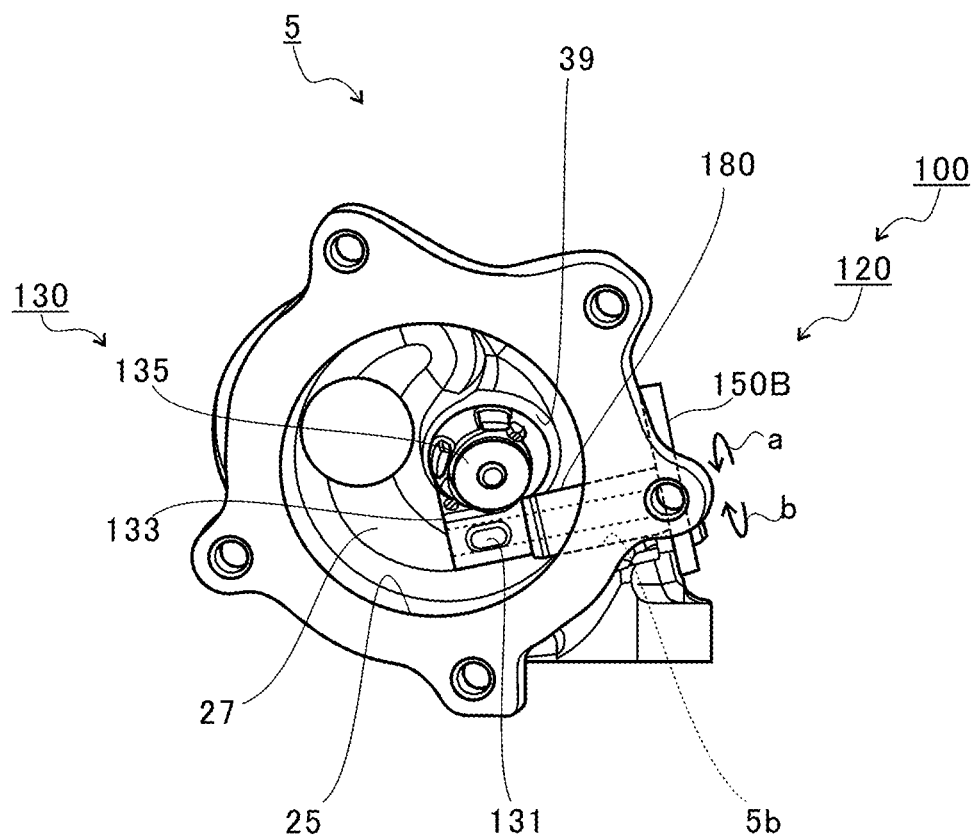
FIG. 3 is a view seen from arrow III in FIG. 2.

FIG. 3 is a view seen from arrow III in FIG. 2. FIG. 3 is an interior view of the turbine housing 5. As shown in FIG. 3, the rotating structure 130 is located in the internal space 27 of the turbine housing 5. The rotating structure 130 includes the rotary shaft 131, a mounting plate 133, and a valve (rotating body) 135.

A through hole 5b is formed in the turbine housing 5. A bearing portion 180 is inserted into the through hole 5b. The bearing portion 180 has a cylindrical shape. The rotary shaft 131 is inserted into the bearing portion 180. The bearing portion 180 rotatably supports the rotary shaft 131.

The rotary shaft 131 is connected to the valve-side link plate 150B at one end, and connected to the mounting plate 133 at the other end. The mounting plate 133 is integrally attached to the rotary shaft 131. For example, the mounting plate 133 is welded to the rotary shaft 131 and rotates integrally with the rotary shaft 131. The valve 135 is attached to the mounting plate 133 at a side opposite to where the rotary shaft 131 is connected. The mounting plate 133 holds the valve 135.

Figure 4:
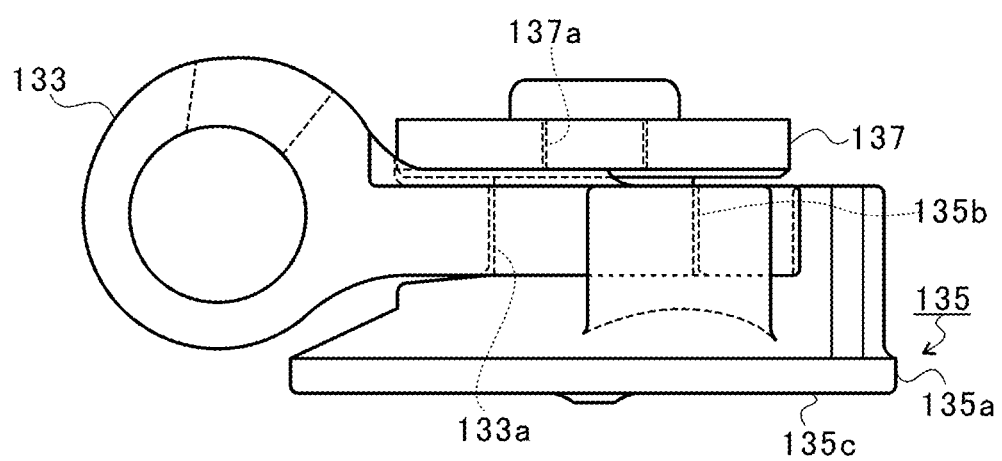
FIG. 4 is an illustration of a connection structure of a valve and a mounting plate.

FIG. 4 is an illustration of a connection structure of the valve 135 and the mounting plate 133. As shown in FIG. 4, the valve 135 includes a body portion 135a and a shaft portion 135b. A position regulating portion 137 is attached to the shaft portion 135b of the valve 135. The body portion 135a includes a contact surface 135c. The shaft portion 135b is formed on the body portion 135a at a side opposite to where the contact surface 135c is formed. The shaft portion 135b extends in a direction orthogonal to the contacting surface 135c. The position regulating portion 137 has a disk shape. The position regulating portion 137 includes a hole 137a.

An insertion hole 133a is formed in the mounting plate 133. The shaft portion 135b of the valve 135 is inserted into the insertion hole 133a of the mounting plate 133. The shaft portion 135b is inserted into the hole 137a of the position regulating portion 137. The position regulating portion 137 is located on the mounting plate 133 at a side opposite to the body portion 135a. The position regulating portion 137 is attached (fixed) to the shaft portion 135b by swaging, for example. The mounting plate 133 is sandwiched between the body portion 135a and the position regulating portion 137. The position regulating portion 137 prevents the valve 135 from falling off the mounting plate 133.

As shown in FIG. 1, a bypass flow path 35 and a wastegate port 37 are formed in the turbine housing 5. The bypass flow path 35 is connected to the turbine scroll flow path 31 at one end, and the other end is connected to the internal space 27 via the wastegate port 37. The bypass flow path 35 connects the turbine scroll flow path 31 to the internal space 27. The bypass flow path 35 and the wastegate port 37 are located radially outside the turbine impeller 15. The bypass flow path 35 directs a portion of the exhaust gas flowing in the turbine scroll flow path 31 into the internal space 27 with bypassing the turbine impeller 15.

In an inner wall forming the internal space 27 of the turbine housing 5, the wastegate port 37 is formed on a seat surface 39 where the valve 135 (contact surface 135c) can contact. The wastegate port 37 is formed downstream of the turbine impeller 15 (closer to the outlet 25). The wastegate port 37 connects the bypass flow path 35 to the internal space 27.

The valve 135 is a valve body of which outer diameter is larger than an inner diameter of the wastegate port 37. In this embodiment, the valve 135 is a wastegate valve. The valve 135 closes the wastegate port 37 when in contact with the seat surface 39. When the wastegate port 37 is closed, a portion of the exhaust gas flowing in the turbine scroll flow path 31 does not flow out to the internal space 27 through the bypass flow path 35 and the wastegate port 37.

The valve 135 opens the wastegate port 37 when spaced apart from the seat surface 39. When the wastegate port 37 is opened, a portion of the exhaust gas flowing in the turbine scroll flow path 31 flows out to the internal space 27 through the bypass flow path 35 and the wastegate port 37.

Returning to FIG. 3, when the actuator 110 (see FIG. 2) drives the rotary shaft 131 to rotate in the direction of arrow a in FIG. 3, the mounting plate 133 integrally rotates with the rotary shaft 131 in the direction of arrow a in FIG. 3. When the mounting plate 133 rotates in the direction of arrow a in FIG. 3, the valve 135 supported by the mounting plate 133 rotates around the central axis of the rotary shaft 131 in the direction of arrow a in FIG. 3.

Figure 5:
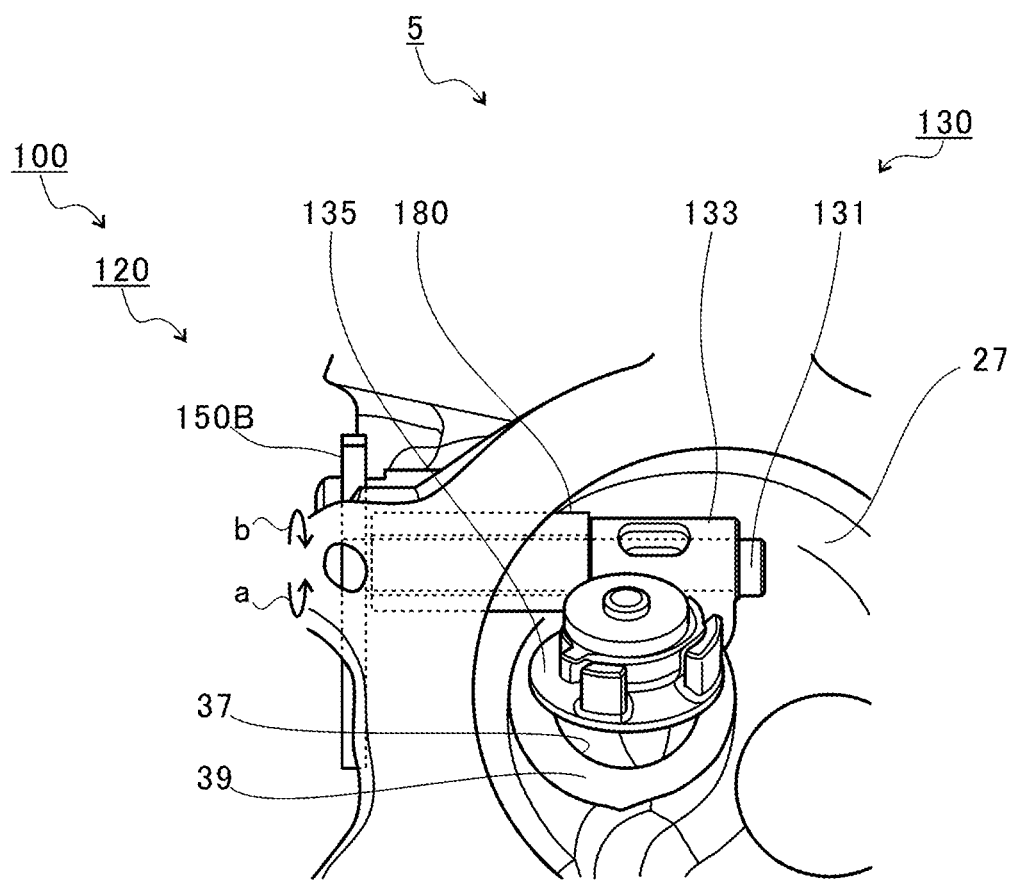

FIG. 5 is an internal view of the turbine housing 5 after the valve 135 shown in FIG. 3 rotates in the direction of arrow a. As shown in FIG. 5, when the valve 135 rotates in the direction of arrow a, the valve 135 moves in a direction spaced apart from the seat surface 39. When the valve 135 is spaced apart from the seat surface 39, the wastegate port 37 is in an open state. Meanwhile, when the actuator 110

(see FIG. 2) drives the rotary shaft 131 to rotate in the direction of arrow b in FIG. 5, the valve 135 rotates around the central axis of the rotary shaft 131 in the direction of arrow b in FIG. 5. As the valve 135 rotates in the direction of arrow b, the valve 135 moves in a direction closer to the seat surface 39 as shown in FIG. 3. When the valve 135 approaches and contacts the seat surface 39, the wastegate port 37 is in a closed state.

Figure 6:
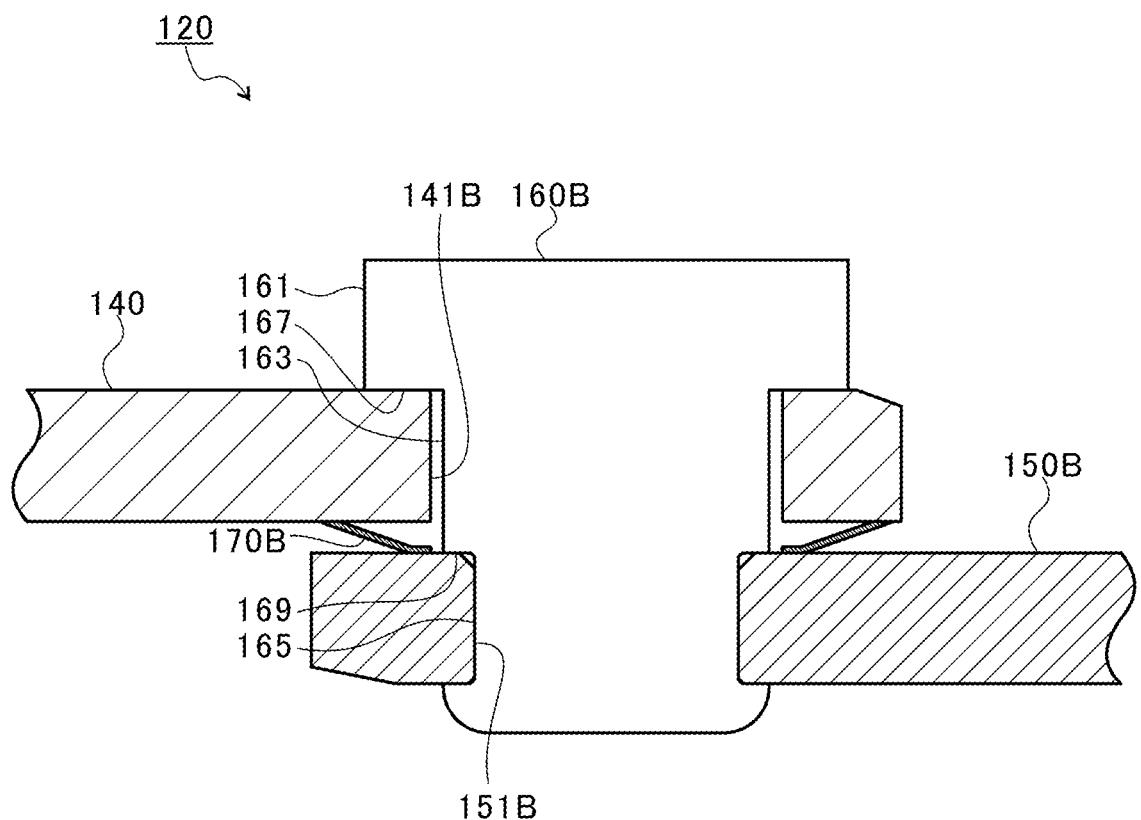
FIG. 6 is a schematic cross-sectional view of a link mechanism according to an embodiment.

FIG. 6 is a schematic cross-sectional view of the link mechanism 120 according to an embodiment. In FIG. 6, a schematic cross-sectional view of the rod (first link portion) 140, the valve-side link plate (second link portion) 150B, the valve-side connecting pin 160B, and the valve-side spring 170B is shown. The configurations of the valve-side link plate 150B, valve-side connecting pin 160B and the valve-side spring 170B are substantially the same as those of the actuator-side link plate 150A, the actuator-side connecting pin 160A and the actuator-side spring 170A. Therefore, the valve-side link plate 150B, valve-side connecting pin 160B and the valve-side spring 170B will be explained in detail. The actuator-side link plate 150A, the actuator-side connecting pin 160A and the actuator-side spring 170A are omitted from detailed descriptions.

As shown in FIG. 6, a larger-diameter portion 161, a medium-diameter portion 163 and a smaller-diameter portion 165 are formed in the valve-side connecting pin 160B. The medium-diameter portion 163 is continuous with the larger-diameter portion 161 at one end and continuous with the smaller-diameter portion 165 at the other end. The larger-diameter portion 161, the medium-diameter portion 163 and the smaller-diameter portion 165 are formed integrally.

The larger-diameter portion 161 has a substantially cylindrical shape. The larger-diameter portion 161 has a constant outer diameter. The outer diameter of the larger-diameter portion 161 is larger than an inner diameter of the valve-side insertion hole (first hole) 141B of the rod 140. The larger-diameter portion 161 is located on the rod 140 at a side opposite to the valve-side link plate 150B and the valve-side spring 170B.

The medium-diameter portion 163 has a substantially cylindrical shape. The medium-diameter portion 163 has a constant outer diameter. A central axis of the medium-diameter portion 163 substantially corresponds to a central axis of the larger-diameter portion 161. The outer diameter of the medium-diameter portion 163 is smaller than the outer diameter of the larger-diameter portion 161. The outer diameter of the medium-diameter portion 163 is less than or equal to the inner diameter of the valve-side insertion hole 141B of the rod 140. In this embodiment, the outer diameter of the medium-diameter portion 163 is smaller than the inner diameter of the valve-side insertion hole 141B of the rod 140. An outer surface of the medium-diameter portion 163 is spaced apart from an inner surface of the valve-side insertion hole 141B. However, the outer surface of the medium-diameter portion 163 may be in contact with the inner surface of the valve-side insertion hole 141B. The outer diameter of the medium-diameter portion 163 is larger than an inner diameter of the pin hole 151B of the valve-side link plate 150B. The medium-diameter portion 163 is at least partially located within the valve-side insertion hole 141B. The rod 140 is not fixed to the medium-diameter portion 163 and can rotate relative to the medium-diameter portion 163. The medium-diameter portion 163 functions as a sliding portion that slides against the valve-side insertion hole 141B of the rod 140. The valve-side spring 170B is arranged radially outside the medium-diameter portion 163.

A larger-diameter stepped surface 167 is formed between the larger-diameter portion 161 and the medium-diameter portion 163. The larger-diameter stepped surface 167 has a substantially annular shape. The larger-diameter stepped surface 167 is continuous with the larger-diameter portion 161 and the medium-diameter portion 163. The larger-diameter stepped surface 167 is substantially perpendicular to the central axis of the larger-diameter portion 161 and the medium-diameter portion 163. The larger-diameter stepped surface 167 functions as a sliding portion that slides against the outer surface of the rod 140.

The smaller-diameter portion 165 has a substantially cylindrical shape. The smaller-diameter portion 165 has a constant outer diameter. A central axis of the smaller-diameter portion 165 substantially corresponds to the central axis of the medium-diameter portion 163. An outer diameter of the smaller-diameter portion 165 is smaller than the outer diameter of the medium-diameter portion 163. The outer diameter of the smaller-diameter portion 165 is smaller than or equal to the inner diameter of the pin hole (second hole) 151B of the valve-side link plate 150B. In this embodiment, the outer diameter of the smaller-diameter portion 165 is substantially equal to the inner diameter of the pin hole 151B. The inner diameter of the pin hole 151B is smaller than the inner diameter of the valve-side insertion hole 141B. The smaller-diameter portion 165 is at least partially located within the pin hole 151B.

A smaller-diameter stepped surface 169 is formed between the medium-diameter portion 163 and the smaller-diameter portion 165. The smaller-diameter stepped surface 169 has a substantially annular shape. The smaller-diameter stepped surface 169 is continuous with the medium-diameter portion 163 and the smaller-diameter portion 165. The smaller-diameter stepped surface 169 is substantially perpendicular to the central axis of the medium-diameter portion 163 and the smaller-diameter portion 165. The smaller-diameter stepped surface 169 is substantially parallel to the larger-diameter stepped surface 167.

The smaller-diameter stepped surface 169 is a contact surface (butt surface) that contacts the valve-side link plate 150B when the valve-side connecting pin 160B is inserted into the valve-side insertion hole 141B and the pin hole 151B. As the smaller-diameter stepped surface 169 contacts the valve-side link plate 150B, the position of the valve-side connecting pin 160B in the central axis direction is determined.

The smaller-diameter portion 165 is fixed to the valve-side link plate 150B at a state where the smaller-diameter stepped surface 169 is in contact with the valve-side link plate 150B. In this embodiment, an end of the smaller-diameter portion 165 is swaged with respect to the valve-side link plate 150B at the state where the smaller-diameter stepped surface 169 is in contact with the valve-side link plate 150B. As a result, the smaller-diameter portion 165 is fixed to the valve-side link plate 150B. However, the smaller-diameter portion 165 is not limited thereto, and may be welded or press-fitted to the valve-side link plate 150B to be fixed to the valve-side link plate 150B.

At this state, the rod 140 is pressed by the valve-side spring 170B in a direction spaced apart from the valve-side link plate 150B. As a result, the rod 140 contacts the larger-diameter stepped surface 167, and presses the larger-diameter stepped surface 167 in a direction spaced apart from the valve-side link plate 150B. The pressing force applied to the larger-diameter stepped surface 167 is determined depending on a distance between the valve-side link plate 150B and the rod 140. The distance between the valve-side link plate 150B and the rod 140 is determined by a distance between the smaller-diameter stepped surface 169 and the larger-diameter stepped surface 167 in the central axis direction of the valve-side connecting pin 160B. Therefore, the biasing force of the valve-side spring 170B can be adjusted, by adjusting the distance between the smaller-diameter stepped surface 169 and the larger-diameter stepped surface 167.

Figure 7:
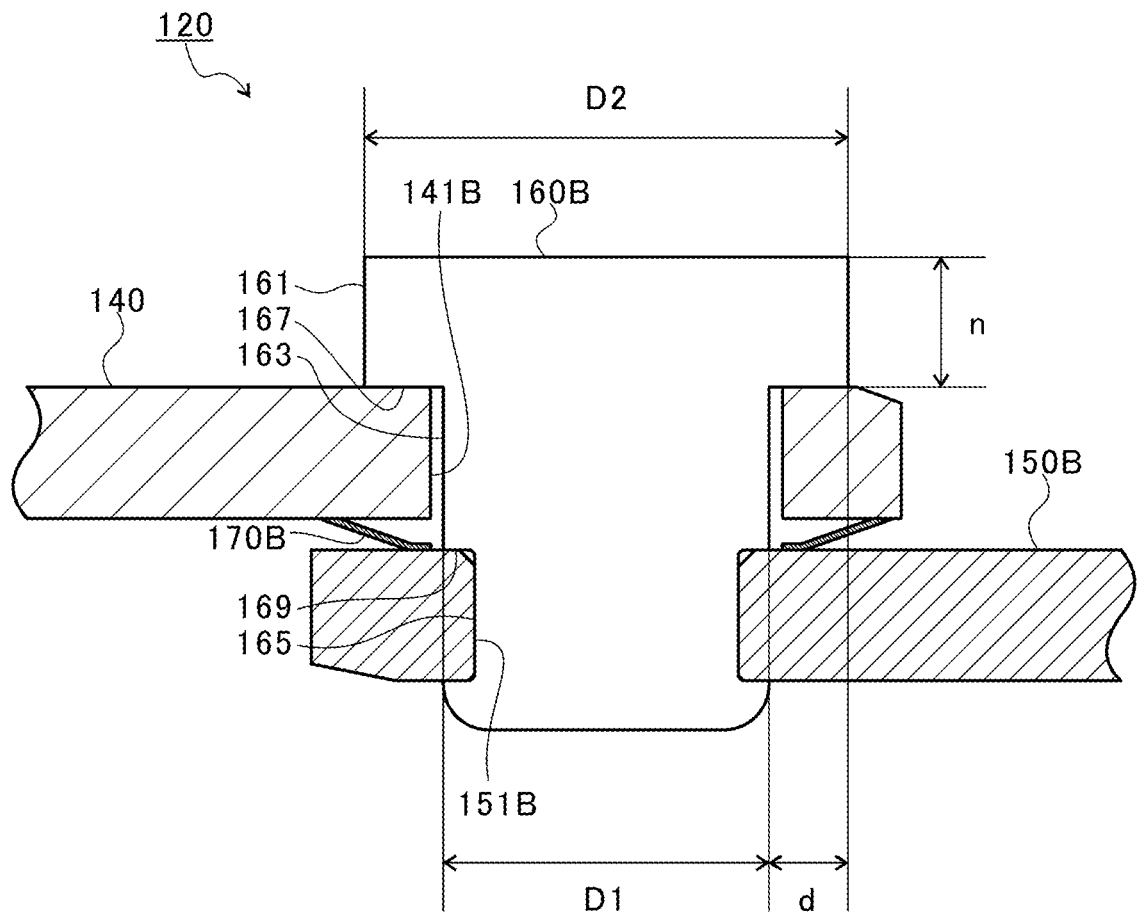
FIG. 7 is an illustration of a dimensional relationship of a valve-side connecting pin.

FIG. 7 is an illustration of a dimensional relationship of the valve-side connecting pin 160B. In FIG. 7, the outer diameter of the medium-diameter portion 163 is represented by D1, and the outer diameter of the larger-diameter portion 161 is represented by D2. Half of a difference between the outer diameter D1 and the outer diameter D2 (i.e., a radial width of the larger-diameter stepped surface 167) is represented by d. A formula for the relationship between the outer diameter D1, the outer diameter D2, and the width d is d=(D2−D1)/2. A height of the larger-diameter portion 161 in the central axis direction is represented by n.

As shown in FIG. 7, a gap between the rod 140 and the valve-side link plate 150B in the central axis direction of the valve-side connecting pin 160B is larger than a gap between the rod 140 and the medium-diameter portion 163 in a radial direction of the valve-side connecting pin 160B. Therefore, when the rod 140 is inclined with respect to the central axis of the valve-side connecting pin 160B, the rod 140 contacts the medium-diameter portion 163 before contacting the valve-side link plate 150B. As a result, when the rod 140 is inclined with respect to the central axis of the valve-side connecting pin 160B, the valve-side spring 170B is prevented from being crushed by the rod 140. As such, decrease of the biasing force (reaction force) of the valve-side spring 170B can be prevented.

As described above, the outer diameter D2 of the larger-diameter portion 161 is larger than the outer diameter D1 of the medium-diameter portion 163. In this embodiment, a formula for the relationship between the outer diameter D1 and the outer diameter D2 is 1.15≤D2/D1≤2. As the value obtained by dividing the outer diameter D2 by the outer diameter D1 approaches 1, the width d of the larger-diameter stepped surface 167 decreases. In other words, as the value obtained by dividing the outer diameter D2 by the outer diameter D1 approaches 1, a pressure-receiving area of the larger-diameter stepped surface 167 pressed by the rod 140 decreases. As the pressure-receiving area of the larger-diameter stepped surface 167 decreases, the applied pressure per unit area increases. In the case where the value obtained by dividing the outer diameter D2 by the outer diameter D1 is less than 1.15, the larger-diameter stepped surface 167 (larger-diameter portion 161) is likely to be worn when the rod 140 slides around the medium-diameter portion 163 with the large-diameter stepped surface 167 pressed against the rod 140. In the case where the value obtained by dividing the outer diameter D2 by the outer diameter D1 exceeds 2, a friction loss between the larger-diameter stepped surface 167 and the rod 140 increases, and the fuel consumption or electric cost of the actuator 110 worsens.

The value of height n of the larger-diameter portion 161 is greater than the value of width d of the larger-diameter stepped surface 167. In the present embodiment, a formula for the relationship between the width d and the height n is 1.1≤n/d≤5. As the value obtained by dividing the height n by the width d decreases, the height n decreases relative to the width d. As the height n decreases, a thickness of the larger-diameter portion 161 decreases, and a durability of the larger-diameter portion 161 decreases. In the case where the value obtained by dividing the height n by the width d is less than 1.1, the durability of the larger-diameter portion 161 is likely to decrease when the larger-diameter stepped surface 167 is pressed against the rod 140. In the case where the value obtained by dividing the height n by the width d exceeds 5, a size and a weight of the larger-diameter portion 161 increase, thereby the friction loss between the larger-diameter stepped surface 167 and the rod 140 increases and the fuel consumption or electric cost of the actuator 110 worsens.

According to the present embodiment, the smaller-diameter portion 165 of the valve-side connecting pin 160B is fixed to the valve-side link plate 150B. The medium-diameter portion 163 of the valve-side connecting pin 160B is inserted into the valve-side insertion hole 141B of the rod 140. The larger-diameter portion 161 of the valve-side connecting pin 160B is located on the rod 140 at the side opposite to the valve-side link plate 150B and the valve-side spring 170B. The larger-diameter portion 161 has the outer diameter larger than the valve-side insertion hole 141B of the rod 140. As a result, even if no retaining ring is provided on the valve-side connecting pin 160B, the valve-side connecting pin 160B can rotatably (slidably) hold the rod 140.

The larger-diameter portion 161 is integrally formed with the valve-side connecting pin 160B, instead of a retaining ring provided on a conventional connecting pin. A volume of the larger-diameter portion 161 is formed larger than a volume of the conventional retaining ring. As a result, the larger-diameter portion 161 of the valve-side connecting pin 160B can improve a durability and a wear-resistance compared to the conventional retaining ring. Accordingly, the rod 140 can be prevented from falling off the valve-side connecting pin 160B when the rod 140 rotates and slides around the medium-diameter portion 163 with the rod 140 pressed by the valve-side spring 170B.

The valve-side connecting pin 160B is provided with the smaller-diameter stepped surface 169. The contact between the smaller-diameter stepped surface 169 and the valve-side link plate 150B makes it easier to control the height between the rod 140 and the valve-side link plate 150B. Machining of the larger-diameter stepped surface 167 and the smaller-diameter stepped surface 169 allows the distance between the rod 140 and the valve-side link plate 150B to be accurately set (managed). As such, the load of the valve-side spring 170B can be set (managed) precisely. Since the attachment of the retaining ring to the valve-side connecting pin 160B is unnecessary, the link mechanism 120 can easily be assembled.

In the present embodiment, the outer diameter D1 of the medium-diameter portion 163 and the outer diameter D2 of the larger-diameter portion 161 of the valve-side connecting pin 160B satisfy the relationship 1.15≤D2/D1≤2. The width d of the larger-diameter stepped surface 167 and the height n of the larger-diameter portion 161 of the valve-side connecting pin 160B satisfy the relationship 1.1≤n/d≤5. By satisfying the above relational formulas, the durability and the wear resistance of the larger-diameter portion 161 can be improved and the friction loss can be reduced.

(First Variant)

Figure 8:
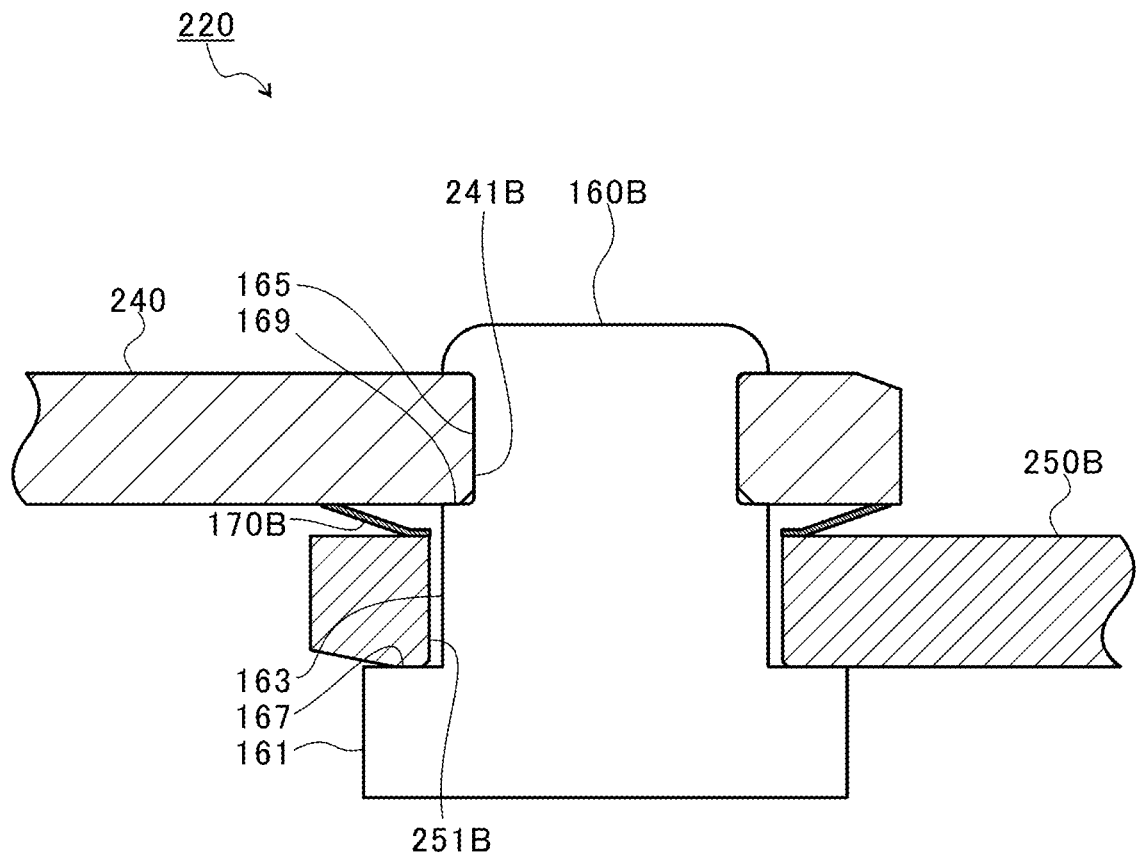
FIG. 8 is a schematic cross-sectional view of a link mechanism of a first variant.

FIG. 8 is a schematic cross-sectional view of a link mechanism 220 of a first variant. Components substantially equal to those of the turbocharger TC of the above embodiment will be assigned with the same reference signs, and omitted from descriptions. The link mechanism 220 of the first variant includes a rod (second link portion) 240 and a valve-side link plate (first link portion) 250B, instead of the rod 140 and the valve-side link plate 150B of the above embodiment. In the first variant, the valve-side connecting pin 160B is arranged upside down with respect to the valve-side connecting pin 160B of the above embodiment. In the first variant, the actuator-side insertion hole 141A of the rod 240, the actuator-side connecting pin 160A, the actuator-side link plate 150A, and the actuator-side spring 170A are configured substantially the same as the valve-side insertion hole 241B of the rod 240, the valve-side connecting pin 160B, the valve-side link plate 250B, and the valve-side spring 170B. Accordingly, the actuator-side insertion hole 141A of the rod 240, the actuator-side connecting pin 160A, the actuator-side link plate 150A, and the actuator-side spring 170A are omitted from detailed descriptions. The other configurations are the same as those in the link mechanism 120 of the above embodiment.

As shown in FIG. 8, a valve-side insertion hole (second hole) 241 B is formed in the rod 240. The valve-side connecting pin 160B is inserted into the valve-side insertion hole 241B. A pin hole (first hole) 251B is formed in the valve-side link plate 250B. The valve-side connecting pin 160B is inserted into the pin hole 251B. In the first variant, an inner diameter of the pin hole 251B is larger than an inner diameter of the valve-side insertion hole 241B.

The outer diameter of the larger-diameter portion 161 is larger than the inner diameter of the pin hole 251B of the valve-side link plate 250B. The larger-diameter portion 161 is located on the valve-side link plate 250B at a side opposite to the rod 240 and the valve-side spring 170B.

The outer diameter of the medium-diameter portion 163 is less than or equal to the inner diameter of the pin hole 251B of the valve-side link plate 250B. In this embodiment, the outer diameter of the medium-diameter portion 163 is smaller than the inner diameter of the pin hole 251B. The outer surface of the medium-diameter portion 163 is spaced apart from the inner surface of the pin hole 251B. However, the outer surface of the medium-diameter portion 163 may be in contact with the inner surface of the pin hole 251B. The outer diameter of the medium-diameter portion 163 is larger than the inner diameter of the valve-side insertion hole 241B of the rod 240. The medium-diameter portion 163 is at least partially located within the pin hole 251B. The valve-side link plate 250B is not fixed to the medium-diameter portion 163 and can slide around the medium-diameter portion 163. The medium-diameter portion 163 functions as a sliding portion that slides against the pin hole 251B of the valve-side link plate 250B. The larger-diameter stepped surface 167 functions as a sliding portion that slides against the outer surface of the valve-side link plate 250B.

The outer diameter of the smaller-diameter portion 165 is less than or equal to the inner diameter of the valve-side insertion hole 241B of the rod 240. In the first variant, the outer diameter of the smaller-diameter portion 165 is substantially equal to the inner diameter of the valve-side insertion hole 241B. The smaller-diameter portion 165 is at least partially located within the valve-side insertion hole 241B. The smaller-diameter stepped surface 169 is a contact surface (butt surface) that contacts the rod 240 when the valve-side connecting pin 160B is inserted into the pin hole 251B and the valve-side insertion hole 241B. As the smaller-diameter stepped surface 169 contacts the rod 240, the position of the valve-side connecting pin 160B in the central axis direction is determined.

The smaller-diameter portion 165 is fixed to the rod 240 at a state where the smaller-diameter stepped surface 169 is in contact with the rod 240. In the first variant, an end of the smaller-diameter portion 165 is swaged with respect to the rod 240 at the state where the smaller-diameter stepped surface 169 is in contact with the rod 240. As a result, the smaller-diameter portion 165 is fixed to the rod 240. However, the smaller-diameter portion 165 is not limited thereto, and may be welded or press-fitted to the rod 240 to be fixed to the rod 240.

At this state, the valve-side link plate 250B is pressed in a direction spaced apart from the rod 240 by the valve-side spring 170B. As a result, the valve-side link plate 250B contacts the larger-diameter stepped surface 167, and the larger-diameter stepped surface 167 is pressed in the direction spaced apart from the rod 240. The pressing force applied to the larger-diameter stepped surface 167 is determined by a distance between the valve-side link plate 250B and the rod 240. The distance between the valve-side link plate 250B and the rod 240 is determined by a distance between the smaller-diameter stepped surface 169 and the larger-diameter stepped surface 167 in the central axis direction of the valve-side connecting pin 160B. Accordingly, by adjusting the distance between the smaller-diameter stepped surface 169 and the larger-diameter stepped surface 167, the biasing force of the valve-side spring 170B can be adjusted.

According to the first variant, the smaller-diameter portion 165 of the valve-side connecting pin 160B is fixed to the rod 240. The medium-diameter portion 163 of the valve-side connecting pin 160B is inserted into the pin hole 251B of the valve-side link plate 250B. The larger-diameter portion 161 of the valve-side connecting pin 160B is positioned on the valve-side link plate 250B at the side opposite to the rod 240 and the valve-side spring 170B. The larger-diameter portion 161 has the outer diameter larger than the pin hole 251B of the valve-side link plate 250B. As a result, the link mechanism 220 of the first variant can obtain the same functions and effects as those of the link mechanism 120 of the above embodiment.

(Second Variant)

Figure 9:
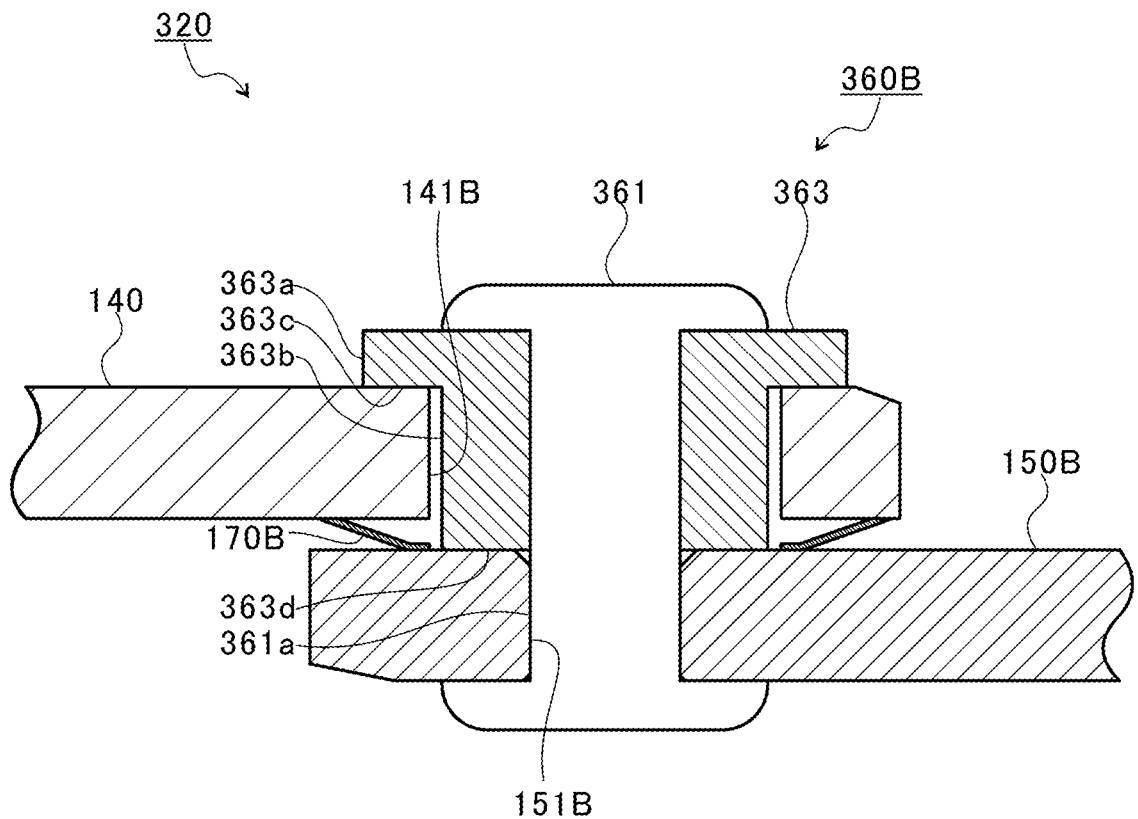
FIG. 9 is a schematic cross-sectional view of a link mechanism of a second variant.

FIG. 9 is a schematic cross-sectional view of a link mechanism 320 of a second variant. Components substantially equal to those of the turbocharger TC of the above embodiment will be assigned with the same reference signs, and omitted from detailed descriptions. The link mechanism 320 of the second variant includes a valve-side connecting pin 360B, instead of the valve-side connecting pin 160B of the above embodiment. In the second variant, the configuration of the actuator-side connecting pin 160A is the same as that of the valve-side connecting pin 360B. Accordingly, detailed descriptions of the configuration of the actuator-side connecting pin 160A will be omitted. The other configurations are the same as those in the link mechanism 120 of the above embodiment.

As shown in FIG. 9, the valve-side connecting pin 360B includes a first portion 361 and a second portion 363. The first portion 361 includes a smaller-diameter portion 361a. The smaller-diameter portion 361a has a substantially cylindrical shape. The smaller-diameter portion 361a has a constant outer diameter. The outer diameter of the smaller-diameter portion 361a is less than or equal to the inner diameter of the pin hole (second hole) 151b of the valve-side link plate (second link portion) 151b. In the second variant, the outer diameter of the smaller-diameter portion 361a is substantially equal to the inner diameter of the pin hole 151B. The smaller-diameter portion 361a is partially located within the pin hole 151B.

The second portion 363 is arranged radially outside the smaller-diameter portion 361a. The second portion 363 includes a larger-diameter portion 363a and a medium-diameter portion 363b. The larger-diameter portion 363a has a substantially cylindrical shape. The larger-diameter portion 363a has a constant outer diameter and a constant inner diameter. The outer diameter of the larger-diameter portion 363a is larger than the outer diameter of the smaller-diameter portion 361a. The inner diameter of the larger-diameter portion 363a is substantially equal to the outer diameter of the smaller-diameter portion 361a. The smaller-diameter portion 361a is arranged radially inside the larger-diameter portion 363a. A central axis of the larger-diameter portion 363a substantially corresponds to a central axis of the smaller-diameter portion 361a. The outer diameter of the larger-diameter portion 363a is larger than the inner diameter of the valve-side insertion hole (first hole) 141b of the rod (first link portion) 140. The larger-diameter portion 363a is located on the rod 140 at a side opposite to the valve-side link plate 150B and the valve-side spring 170B.

The medium-diameter portion 363b has a substantially cylindrical shape. The medium-diameter portion 363b has a constant outer diameter and a constant inner diameter. The outer diameter of the medium-diameter portion 363b is smaller than the outer diameter of the larger-diameter portion 161, and larger than the outer diameter of the smaller-diameter portion 361a. The inner diameter of the medium-diameter portion 363b is substantially equal to the outer diameter of the smaller-diameter portion 361a. The smaller-diameter portion 361a is arranged radially inside the medium-diameter portion 363b. A central axis of the medium-diameter portion 163 substantially corresponds to the central axes of the smaller-diameter portion 361a and the larger-diameter portion 363a. The outer diameter of the medium-diameter portion 363b is less than or equal to the inner diameter of the valve-side insertion hole 141B of the rod 140. In the second variant, the outer diameter of the medium-diameter portion 363b is smaller than the inner diameter of the valve-side insertion hole 141 B. An outer surface of the medium-diameter portion 363b is spaced apart from the inner surface of the valve-side insertion hole 141B. However, the outer surface of the medium-diameter portion 363b may be in contact with the inner surface of the valve-side insertion hole 141B. The outer diameter of the medium-diameter portion 363b is larger than the inner diameter of the pin hole 151B of the valve-side link plate 150B. The medium-diameter portion 363b is at least partially located within the valve-side insertion hole 141B. The rod 140 has a larger inner diameter than the pin hole 151B. The rod 140 is not fixed to the medium-diameter portion 363b and can slide around the medium-diameter portion 363b.

A larger-diameter stepped surface 363c is formed between the larger-diameter portion 363a and the medium-diameter portion 363b. The larger-diameter stepped surface 363c has a substantially annular shape. The larger-diameter stepped surface 363c is continuous with the larger-diameter portion 363a and the medium-diameter portion 363b. The larger-diameter stepped surface 363c is substantially perpendicular to the central axis of the larger-diameter portion 363a and the medium-diameter portion 363b.

A small-diameter stepped surface 363d is formed on the medium-diameter portion 363b at an end face spaced apart from the larger-diameter portion 363a. The smaller-diameter stepped surface 363d has a substantially annular shape. The smaller-diameter stepped surface 363d is substantially perpendicular to the central axis of the medium-diameter portion 363b. The smaller-diameter stepped surface 363d is substantially parallel to the larger-diameter stepped surface 363c.

The smaller-diameter stepped surface 363d is a contact surface (butt surface) that contacts the valve-side link plate 150B when the valve-side connecting pin 360B is inserted into the valve-side insertion hole 141B and the pin hole 151B. The position of the valve-side connecting pin 360B in the central axis direction is determined by the contact between the smaller-diameter stepped surface 363d and the valve-side link plate 150B.

The smaller-diameter portion 361a is fixed to the valve-side link plate 150B at a state where the smaller-diameter stepped surface 363d is in contact with the valve-side link plate 150B. In the second variation, one end of the smaller-diameter portion 361a is swaged with respect to the valve-side link plate 150B at the state where the smaller-diameter stepped surface 363d is in contact with the valve-side link plate 150B, and the other end of the smaller-diameter portion 361a is swaged with respect to the larger-diameter portion 363a of the second portion 363. As a result, the first portion 361 is fixed to the valve-side link plate 150B and the second portion 363. The first portion 361, the second portion 363, and the valve-side link plate 150B are integrally configured. However, the smaller-diameter portion 361a is not limited thereto, and may be welded or press-fitted to the valve-side link plate 150B and the second portion 363 to be fixed to the valve-side link plate 150B and the second portion 363.

According to the second variant, the smaller-diameter portion 361a of the valve-side connecting pin 360B is fixed to the valve-side link plate 150B. The medium-diameter portion 363b of the valve-side connecting pin 360B is inserted into the valve-side insertion hole 141B of the rod 140. The larger-diameter portion 363a of the valve-side connecting pin 360B is located on the rod 140 at a side opposite to the valve-side link plate 150B and the valve-side spring 170B. The larger-diameter portion 363a has the outer diameter larger than the valve-side insertion hole 141B of the rod 140. As a result, the link mechanism 320 of the second variant can obtain the same functions and effects as those of the link mechanism 120 of the above embodiment.

In the second variant, the valve-side connecting pin 360B includes a plurality of portions (the first portion 361 and the second portion 363). As such, for example, even if the shape and the size of the rod 140 (valve-side insertion hole 141B) or the valve-side spring 170B are changed, the first portion 361 can be used as it is by changing the shape and the size of the second portion 363. As a result, the valve-side connecting pin 360B of the second variant can reduce cost when applied to various link mechanisms 320 (e.g., types of rod 140 or valve-side spring 170B).

Although the embodiments of the present disclosure have been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

In the above embodiment and the first and second variants, the link mechanisms 120, 220 and 320 are applied to the valve device that opens and closes the wastegate port 37. However, the link mechanisms 120, 220 and 320 are not limited thereto, and may also be applied to any other valve devices that open and close an opening. For example, the link mechanisms 120, 220 and 320 may be applied to a valve device that opens and closes an opening connecting two turbine scroll flow paths in a turbine housing of a twin scroll turbocharger. For example, the link mechanisms 120, 220 and 320 may be applied to a variable stator vane mechanism that changes an opening degree of the connecting path 29 in the turbine housing 5. In that case, the link mechanisms 120, 220 and 320 may actuate a rotating structure that rotates nozzle vanes of the variable stator vane mechanism.

The link mechanism 320 of the second variant may be combined with the link mechanism 220 of the first variant. In other words, the valve-side connecting pin 360B of the second variant may be used instead of the valve-side connecting pin 160B of the first variant.

The link mechanism 120 of the above embodiment, the link mechanism 220 of the first variant, and the link mechanism link mechanism 320 of the second variant may be combined with each other. For example, in the link mechanism 120 of the above embodiment, the valve-side connecting pin 360B of the second variant may be used instead of the actuator-side connecting pin 160A.

What is claimed is:

1. A link mechanism comprising:
   a first link portion including a first hole;
   a second link portion including a second hole;
   a rotary shaft of a rotating body attached to the first link portion or the second link portion;
   a spring arranged between the first link portion and the second link portion; and
   a connecting pin including:
      a larger-diameter portion that is located on the first link portion at a side opposite to the second link portion and the spring and that has an outer diameter larger than an inner diameter of the first hole and an inner diameter of the second hole;
      a medium-diameter portion that has an outer diameter smaller than that of the larger-diameter portion and that is at least partially located within the first hole; and
      a smaller-diameter portion that has an outer diameter smaller than that of the medium-diameter portion and that is at least partially located within the second hole, wherein
   the connecting pin includes:
      a first portion including the smaller-diameter portion; and
      a monolithic second portion arranged radially outside the smaller-diameter portion and including the medium-diameter portion and the larger-diameter portion, and
   the first portion and the monolithic second portion are discrete from each other.

2. The link mechanism according to claim 1, wherein the connecting pin satisfies the following formulas:

$1.15 \leq D2/D1 \leq 2$ and $1.1 \leq n/d \leq 5$ where,
   D1: the outer diameter of the medium-diameter portion,
   D2: the outer diameter of the larger-diameter portion,
   d: half of the difference between D1 and D2, and
   n: a height of the larger-diameter portion in a central axis direction.

3. The link mechanism according to claim 2, wherein a gap in a central axis direction of the connecting pin between the first link portion and the second link portion is larger than a gap in a radial direction of the connecting pin between the medium-diameter portion and the first hole.

4. The link mechanism according to claim 2, wherein one end of the spring contacts the first link portion, and the other end of the spring contacts the second link portion.

5. The link mechanism according to claim 1, wherein a gap in a central axis direction of the connecting pin between the first link portion and the second link portion is larger than a gap in a radial direction of the connecting pin between the medium-diameter portion and the first hole.

6. The link mechanism according to claim 1, wherein one end of the spring contacts the first link portion, and the other end of the spring contacts the second link portion.

7. A turbocharger comprising the link mechanism according to claim 1.

* * * * *